United States Patent Office 3,104,234
Patented Sept. 17, 1963

3,104,234
SPRAY DRYING OF RESIN EMULSIONS AND
PRODUCTS OBTAINED THEREBY
Walter J. Bray, Jr., Longmeadow, Mass., assignor to Shawinigan Resins Corporation, Springfield, Mass., a corporation of Massachusetts
No Drawing. Filed June 30, 1958, Ser. No. 745,336
4 Claims. (Cl. 260—41)

The present invention relates to spray drying of resin emulsion and products obtained thereby.

Recent teachings have led the way to spray drying of certain latex type aqueous resin emulsions into a powder from which is redispersable in water and is capable upon redispersion of forming a film which in one way or another has useful properties. While the advantages of spray drying these emulsions are great, the full potentiality of the spray drying process has not been realized because of the relatively low drying temperatures which must generally be used and because at least in the case of certain resins there is a loss in the redisperisbility characteristic when the spray dried product is stored at ordinary room temperatures for any substantial length of time.

Both of these problems result from the fact that the resin itself has thermoplastic properties. Thus, in the case of the spray drying of the resin, it is necessary that the resin particles be maintained below a temperature at which the individual resin particles tend to fuse together, otherwise the spray dried product will not have the desired properties of redispersion.

This can be better understood from the nature of the spray drying operation which involves atomization of the resin emulsion into very fine droplets in a high temperature air stream. These droplets are dried and maintained as discrete powder particles each containing a relatively large number of resin particles having a size in the order of .05 to eight microns. The best explanation for the redispersability of the individual powder particles is believed to stem from the existence of a colloidal film separating the individual resin particles of each dried powder particle so that the indifidual resin particles thereof will become redispersed as an emulsion when the powder is again added to water.

It has in the past been realized that a definite maximum exists for the absolute temperature to which the resin particles may be raised and thus limits the rate at which a given resin may be spray dried. This maximum limit, as influenced by the time factor involved, is believed to be that temperature at which the internal forces within the resin particles cause a break down of the colloidal film separating the individual resin particles thereby allowing the individual resin particles to agglomerate and form non-redispersible "granules."

The related problem of the spray dried powder caking so that it becomes difficult or impossible to be redispersed is also believed to result from a thermoplastic property of the resin which is known as cold flow. This problem is extremely important when it is realized that some resins may be satisfactorily spray dried and yet become unusable when stored for as short as 24 hours or less after which the powder particles have caked and are no longer redispersible. It is believed that caking results from the resin particles flowing under the influence of gravity in a manner which will break down the colloidal film by which they are separated, with a resultant progressive tendency of the resin particles to cohere up to the point that there is at least a partial fusion of the resin particles which in turn renders them non-redispersible.

Caking of stored resin powder is not a novel problem nor is it necessarily limited to spray-dried resin powder as may be witnessed by the wide variety of anti-caking methods found in the prior art. The present invention is not primarily concerned, however, with preventing spray dried resin powder from caking but instead has for one object the provision of a method for producing a novel spray-dried resin powder which may be stored for long periods of time at room temperature and retain its ability to redisperse in water to form a reconstituted emulsion capable of forming a usable resin film.

This property is herein referred to as storage stability. All of which is not to be confused with the fact that the ability of the resin powder of the present invention to fulfill such ends may be gauged by the extent of its anticaking properties.

Another object of the invention is to increase the permissible temperatures at which resin emulsions may be spray-dried and thus increase the rate at which spray-dried resin powder may be produced and further to do so in a manner yielding a spray-dried powder which is more readily redispersible.

These ends may be attained by taking a resin emulsion as ordinarily constituted after polymerization and adding to the emulsion an admixture selected from a group comprising inert particulate solids having a particle size in the order of .005 to 8 microns, hydrophilic colloids, soluble salts and mixtures thereof. The admixture may comprise one or more of the members given in the above class in an amount of from 1% to 300% based on the weight of the resin in the emulsion. After inclusion of the admixture, the resin emulsion is spray-dried by conventional techniques with the exception that the drying temperatures may be maintained substantially above the level previously found to be an upper limit for a given resin. Thus the drying operation may be carried on at a faster rate. The spray d' 'd product is a fine free flowing powder comprising individual powder particles each of which in turn comprises individual discrete resin particles surrounded by a colloidal film with the admixture interspersed between and around the resin particles of each powder particle.

This powder is dispersible in water to reconstitute a true emulsion which forms a usable resin film when applied to a surface. A further characteristic of this spray dried powder is that it may be stored for long periods of time at ordinary room temperatures without losing its redispersibility characteristic.

While the present invention teaches an improved process for spray drying resin emulsions at higher temperatures than in the past, it is to be recognized that the advantages of the present invention are not universally applicable to all resin emulsions. This can be better understood from the correlation which exists between the second order transition temperature of a given resin and the maximum temperature to which it may be heated without losing the ability to redisperse upon being spray-dried. The maximum drying temperature is taken, for practical purposes as the maximum permissible outlet temperature of the spray drying apparatus employed in obtaining a redispersible powder. The maximum temperature and the apparent second order transition temperature of a given resin are usually lowered when plasticizers or the like are included in the resin emulsion.

It can next be noted that the range of second order transition temperatures is extremely wide, varying not only between different types of resins, but also between different molecular weights of a given type of resin.

Some resins, for example, having a high second order transition temperature may be spray dried to obtain a redispersible powder without the need of any admixture as herein taught. Other resins, in distinction have such a low second order transition temperature that the quantity of admixture required to obtain redispersibility becomes intolerable insofar as a particular end use of the resin is concerned.

The advantages of the present invention will thus be most effective for resins having second order transition temperatures which permits maximum drying temperatures in the range of 0° F. to 200° F. Polyvinyl acetate resins of a relatively low molecular weight, roughly 200,000 or less, are representative of the resins which when emulsified can most effectively be improved in spray drying by the teachings of the present invention. However, acrylates and other resins having the stated range of temperature characteristics also fall within the scope of the present invention.

Aqueous resin emulsions may be formulated in many fashions and may follow the general outline of steps which comprises mixing a liquid monomer with water, a catalyst, an emulsifier and a dispersing agent in different orders dependent on various conditions and needs. This aqueous mixture is then agitated with or without additional heat being supplied, and a progressive polymerization of the monomer takes place, with the final molecular weight dependent upon the amount of catalyst and the size of the resin particles or macromolecules dependent on the amount of dispersing agent and with a minimum amount of emulsifier to provide sufficient colloidal effect.

Resin emulsions as herein contemplated are formulated in such a manner with resin particles having a size range in the order of .05 to 8 microns. Such resin emulsions, as is more particularly taught in U.S. Patents 2,444,396 and 2,614,088 are capable of laying down a protective water resistant film as well as having adhesive properties which may be employed in many ways.

It was indeed unexpected that such resin emulsions capable of forming a water resistant film could be spray dried to obtain a redispersible powder as taught in U.S. Patent 2,800,463—Morrison. However it has now been found that the teachings of Morrison are limited by the long drying time required for certain resin emulsions and are also limited in regard to maximum drying temperatures which may be employed. Further, some of the spray dried powders of Morrison lose their ability to redisperse in a matter of days so that for practical purposes, these powders are unacceptable as commercial products which must have at least some appreciable shelf life at ordinary room temperatures.

It has been found that the inclusion of an admixture, as herein taught in the resin emulsion after polymerization and before spray-drying will overcome or minimize many or all of the above-noted problems, that is, the emulsion may be spray dried at temperatures substantially above the temperature at which the resin alone may be dried. Further, the spray dried powder will have a greater ability, to redisperse as a true emulsion substantially equivalent to the original emulsion.

The admixture herein referred to may best be characterized by the end product of the spray drying process that is, the spray dried product of the present invention is a fine free-flowing powder with the powder particles having a size in the order of 20–100 microns. Each powder particle comprises a plurality of resin particles having a size in the order of .05 to 8 microns, with the colloidal emulsifier bonded thereto. Interspersed within each powder particle are separators comprising minute particles which, it is presumed, physically space the resin particles so that there is little or no tendency of the individual resin particles to fuse together because of cold flow when stored at ordinary room temperatures for long periods. Further, these separators are found on the exterior surfaces of each powder particle so that there is not tendency for the powder particles to fuse together, either. All of which contributes a high degree of storage stability to the spray dried product of the present invention in that it is at least substantially completely redispersible even when stored for long periods of time at ordinary room temperatures.

These separators or minute particles found in the spray dried product originate from the admixture which was introduced into the resin emulsion prior to the spray drying operation. The admixture was thoroughly dispersed in the emulsion so that when the emulsion was atomized, each droplet so formed contained a portion of the admixture.

As the water is driven from the droplets in the drying chamber of the apparatus, the minute particles serve to separate the individual resin particles in each droplet as it is converted to a powder particle, thus preventing any substantial loss of identity of the individual resin particles when heated in the drying chamber.

The usual arrangement of spray drying apparatus comprises at least two temperature controls, one for the primary or atomization air and the other for controlling the outlet temperature. Relatively high temperatures may be employed for the primary air since the water serves as an insulator preventing the absolute temperature of the resin particles from being raised to a point where there would be any undesirable effects. However, as the resin material passes towards the outlet of the drying chamber substantially all the water has been driven therefrom and very definite upper limits are to be found above which the outlet temperature cannot be raised if the spray dried product is to be redispersible. This upper limit of the dryer outlet temperature is, for lack of a more accurate measuring means, referred to as the maximum temperature to which the resin may be heated, which term is to be found in various portions of the present specification.

The maximum drier outlet temperature for a given resin may be empirically established and will be found proportionate to the second order transition temperature and molecular weight of the emulsified resin.

As will be shown from the examples given hereinafter, the use of an admixture which supplies these minute separating particles substantially increases the maximum temperature to which the resin, i.e. drier outlet temperatures may be raised and yet a redispersible spray dried product will be obtained.

The obtaining of higher permissible outlet temperature makes possible an increased efficiency in drying some types of resins while other resins which could not hitherto be spray dried to provide redispersible powders previously unobtainable.

Reverting back to the admixture for attaining these ends, it has already been noted that the admixture is characterized by the minute particles which act as separators preventing fusion of the individual resin particles both during the spray drying process and storage of the spray dried product so that the property of redispersibility is maintained. In a generic sense, all admixtures herein contemplated are further characterized by their compatability with the resin emulsion and their minute particle size as found in the spray dried product.

There are in fact three classes of materials which form a group from which the admixture may be selected either as a single component from one class or as a combination of two or more of the classes.

Briefly, this group consists of inert solids of small particle size, hydrophilic colloids and soluble salts. Each of these classes, however, will be later described in a more explicit fashion.

Several factors will influence the selection of an admixture for a given resin emulsion. Thus the effectiveness of the admixture in raising permissible temperatures, the effectiveness of preserving redispersibility, the end use of the spray dried product and cost will all influence the selection of a particular admixture. Of these factors, the first two may be experimentally determined and the preferred additive, as influenced by cost, determined. The effectiveness of various additives will be reflected in the specific examples hereinafter set forth.

While the effectiveness of the additives in increasing drying temperatures and stability of the spray dried product may be empirically determined, the composition of the admixture must, nonetheless, be such that the needs of the end use of the spray dried product are served. Therefore where a high degree of water resistance is a requisite, it is preferable to select the admixture from the class of inert solids. The inert solid admixtures are not quite as effective in increasing storage stability as the classes of additives comprising hydrophilic colloids and soluble salts but even so they do show some increase in this property over the same properties of a resin emulsion which has been spray dried without any admixture and more important they generally increase the water resistance of the films of reconstituted emulsions.

As will be more fully developed in detail hereinafter, the combined advantages of maximum effectiveness in increasing drying temperatures and resin powder stability as well as water resistance of the film cast by a reconstituted emulsion may be had by selecting the admixture from a combination of the classes of hydrophilic colloids and inert solids or a mixture of the classes of soluble salts and inert solids.

Examples I–VI, set forth in Table A, illustrate the approximate upper temperature limits for various resin emulsions as reflected by maximum permissible outlet drier temperatures. These temperatures were determined by spray drying the identified resin emulsions, using apparatus of the type taught in U.S. Patent 2,800,463. It will be noted that maximum outlet drier temperatures are related to "wet bulb" temperatures. In the case of all the examples herein given humidity conditions were substantially the same so that the dry bulb temperatures reflect a true picture of the comparative increases in permissible drying temperatures afforded by the present invention. These temperatures are the maximum for the apparatus used, however, they may be higher for more efficiently designed spray drying apparatus.

Further where redispersibility of the spray dried powder is rated the following basis of judging was employed. A 50% solids emulsion was prepared by combining the spray dried powder to be rated with water.

The powder water mixture was stirred or agitated to obtain a reconstituted emulsion and then left standing for one hour. Next this reconstituted emulsion was agitated for 10 minutes with a high speed mixer. The emulsion was then left standing for an additional 48 hours. The redispersibility of a powder is rated as "good" if only a slight trace of settling has occurred after this last period of standing. If most of the solids have settled out of the emulsion, its redispersibility is rated as "poor" and if an intermediate amount of settling has occurred, the redispersibility is rated as "fair."

Generally speaking, it is requisite that the spray dried power have "good" redispersibility if the reconstituted emulsion is to be able to cast a satisfactory film.

TABLE A

| Example | Resin Emulsion | Admixture | Drier Outlet Temp., °F. | Redispersibility |
|---|---|---|---|---|
| I | A | none | 175 | Good. |
|  | A | ....do.... | 180 | Poor. |
|  | A | 5% colloidal calcium carbonate. | 200 | Good. |
| II | B | none | 106 | Do. |
|  | B | ....do.... | 120 | Fair. |
|  | B | 5% methyl-cellulose | 149 | Good. |
|  | B | 5% sodium bicarbonate. | 138 | Do. |
| III | C | none | 115 | Do. |
|  | C | ....do.... | 129 | Poor. |
|  | C | 10% dextrin | 185 | Good. |
| IV | D | none | 108 | Do. |
|  | D | ....do.... | 117 | Fair. |
|  | D | ....do.... | 125 | Poor. |
|  | D | 5% colloidal silica | 122 | Good. |
|  | D | 10% colloidal silica | 130 | Do. |
| V | E | none | 101 | Do. |
|  | E | ....do.... | 107 | Fair. |
|  | E | ....do.... | 117 | Poor. |
|  | E | 25% dextrin | 194 | Good. |
| VI | F | none | 77 | Poor. |
|  | F | 25% methyl-cellulose | 91 | Good. |

Resin Emulsion:
A—55% solids content polyvinyl acetate emulsion substantially as taught in U.S. Patent 2,614,088—Example 3.
B—40% solids content polyvinyl acetate emulsion substantially as taught in U.S. Patent 2,508,341—Example 15.
C—40% solids content polyvinyl acetate emulsion substantially as taught in U.S. Patent 2,444,396—Example B.
D—40% same as emulsion C but with the substitution of a copolymer of vinyl acetate with dibutyl fumarate as taught in U.S. Patent 2,614,088—Example 2.
E—40% solids content polyvinyl acetate emulsion substantially as taught in U.S. Patent 2,614,088—Example 1.
F—40% solids content acrylate emulsion available from Rohm & Haas Co., Philadelphia, Pa., under the trade name "Rhoplex AC-33" made according to Example 1, U.S. 2,795,564.

In Examples I–VI, the admixture was, in each instance added to the resin emulsion after polymerization. The maximum possible drying temperatures of the resin emulsions plus admixture are not necessarily reflected by the values given in Table A which are intended primarily to illustrate that the inclusion of an admixture substantially increases the maximum outlet temperature which may be employed in spray drying a given resin emulsion.

The benefits of this increase vary between different resin emulsions. Thus there were no great problems in spray drying the emulsion of Example I without an admixture since its maximum drying temperature is relatively high, but with the inclusion of the admixture it may be dried at an increased rate due to the substantial increase in permissible maximum temperature. The same benefits are found in Examples II–V, except that they are even more pronounced in that, without an additive, the maximum permissible temperature for these resins closely approaches ambient air temperature making production of spray dried products on a commercial scale extremely difficult and painstaking especially during the summertime.

Example VI is even more dramatic in illustrating a resin emulsion with a second order transition temperature in the order of 32° F. which, without and admixture, would not yield a redispersible spray dried product even when the lowest possible outlet temperature was maintained on the spray drying apparatus. With the admixture comprising 25% methylcellulose in Example VI spray drying was carried out at an outlet temperature which may be maintained in a practical manner at least at most times and a spray dried product provided which was previously unobtainable.

The examples of Table A also illustrate that the admixture may comprise a hydrophilic colloid (Examples II, III and V), insoluble inert material of a very small particle size (Examples I and IV), or a soluble salt (Example II). All of these materials have the ability, when added to the emulsion before drying, to provide interspersed separators which prevent or deter fusing of the resin particles (.05 to 8 microns in size) as the emulsion is atomized into droplets and the droplets dried into powder particles. These separators further prevent fusion of the resin particles when the spray dried product is stored so that not only may drying temperatures be elevated but the storability of the spray dried product is vastly improved in most cases.

Referring first to the class of hydrophilic colloids, as herein used, this term includes polyvinyl alcohol, partially hydrolyzed polyvinyl acetate, as for example polyvinyl alcohol containing up to 50% acetate groups. These colloids are especially suitable when they are made from polyvinyl acetate having a viscosity of not over 7 centipoises as determined in a 1-molar benzene solution at 20° C. Other suitable colloids are soluble starch, soluble starch degradation products, e.g. Stayco M, the methyl ether of cellulose, water soluble, glycol cellulose, gum tragacanth, gum acacia, sodium alginate, agar-agar, gum tragon, gum arabic, glue, gelatins, Gomogel, cellosize WS (hydroxyethyl cellulose), sodium carboxymethylcellulose and the like.

It will be noted that hydrophilic colloids are conventionally present in resin emulsions and were in fact present in resin emulsions which have been spray dried in the past as described in the above-mentioned Morrison patent as well as in U.S. Patent 2,733,995—Robinson. The distinction of the present invention is found in the fact that unexpected results of higher permissible temperatures and stability are obtained when the hydrophilic colloids are added to the resin emulsion after polymerization instead of prior to or during polymerization as where the hydrophilic colloids are to serve as emulsifiers or dispersing agents or both.

This end result is the more surprising in view of the fact that the same increase in stability and permissible drying temperature will not be obtained if say 6% polyvinyl alcohol is added during emulsion polymerization of polyvinyl acetate as where 3% polyvinyl alcohol is added during polymerization and then an additional admixture of 3% polyvinyl alcohol is introduced into the resin emulsion after polymerization and preferably just prior to spray drying of the resin.

The class of inert insoluble materials may include a wide variety of materials such as silica, clay, carbon black, sulfur, diatomaceous earth and other calcium and magnesium silicates, titanium dioxide, umbers and other pigments, calcium carbonate and like materials which are inert in the resin emulsions. The common property of these inert materials being that they have an extremely small particle size, in the order of .005 to 8 microns and preferably in the range of .02 to 2 microns. It will further be noted that siliceous inert materials were preferable in that a given quantity of siliceous additive was most effective in increasing permissible temperatures and storage stability as well as increasing the water resistance of a film cast from a reconstituted emulsion.

The class of water soluble salts is relatively broad and includes inorganic salts of the usual type which have the property of crystallizing out of solution.

Further, these salts must be compatible with the resin emulsion and not cause any undesired effects thereon. Additionally this class of water soluble salts must have a melting point or decomposition point at a temperature at least above the maximum resin temperature, i.e. dryer outlet temperature.

Example of suitable inorganic salts which can be used in the practice of this invention in addition to the sodium bicarbonate used in the preceding examples includes sodium sulfate, ammonium chloride, barium chloride, calcium chlorate, chromous chloride, cobaltous sulfate, cupric chloride, ferric chloride, magnesium chromate, potassium bisulfate, zinc chloride and others.

The amount of admixture is influenced primarily by two factors, the amount needed to get a workable dryer outlet temperature and at the same time a stable spray dried product. The second factor is the amount of admixture which can be tolerated in the end use of the spray dried product. A third factor which, of course, cannot be neglected is the cost of the admixture.

It will be noted that the increase in permissible drying temperature is proportionate to the amount of admixture as was indicated by Example IV above. In Table B below, Examples VII and VIII further illustrate this point.

TABLE B

| Example | Resin Emulsion | Admixture | Drier Outlet Temp., °F. | Redispersibility |
|---|---|---|---|---|
| VII | B | 1%,¹ ASP 400 | 122 | Good. |
|  |  | 3%, ASP 400 | 124 | Do. |
|  |  | 5%, ASP 400 | 126 | Do. |
| VIII | B | 2½% polyvinyl alcohol | 122 | Do. |
|  |  | 5% polyvinyl alcohol | 131 | Do. |

Resin Emulsion B—Same as in Example II.
¹ Aluminum silicate clay sold by Minerals and Chemicals Corp. of America.

It will be seen that the increase in permissible drying temperatures increases as the amount of admixture is increased. However, this relationship is not linearly proportionate and temperature increases are somewhat greater for the initial increments of admixture than for latter increments. Nonetheless a wide range in the usable amount of admixture exists and, again, the amount used is dependent on what may be tolerated in the end use of the resin. Based on the weight of resin, an admixture as small as 1% may be effective, while in some instances as much as 300% admixture may be tolerated and the benefits of a relatively high drying temperature and high powder stability enjoyed. The preferred amount of admixture, however, is within the range of 3% to 25%, this range giving for polyvinyl acetate emulsions a substantial increase in drying temperature, and stability with a minimum effect of the admixture on the end use of the spray dried product.

While the three classes of admixture herein defined are more or less equally effective in increasing the permissible drying temperature for resin emulsion, distinctions are to be found in their effectiveness in an increasing of the stability of the powder during storage and the ability of a reconstituted emulsion to cast a film equivalent to the film obtained from the original emulsion.

Dealing first with the question of stability, it has been found that both the hydrophilic colloids and soluble salts are highly effective in increasing the ability of the spray dried powder to redisperse after being stored for considerable time. On the other hand, the inert solid admixtures are somewhat less effective in increasing stability. Where water resistance is a requisite property in the end use of the spray dried powder then an inert solids admixture should be selected or if a hydrophilic colloid or a soluble salt admixture is to be used along, then the amount of admixture should be kept at a minimum.

The examples of Table C illustrates the different effects just described. In each of the examples in Table C, the admixture was introduced into resin emulsion B, defined above, after polymerization and a spray-dried product obtained in the manner previously described. Further in each of the examples, the outlet dryer temperature was maintained at 113° F. or slightly above the temperature indicated in Example II, that gave a spray dried product having good redispersibility from the resin emulsion without an additive.

The present examples of Table C illustrate the comparative effects of the different classes of admixtures on spray dried powder insofar as storage stability and water resistance are concerned. It will also be noted in Table C that the same quantity of admixture was used in each example for comparative purposes.

The criterion of redispersibility of the examples of Table C is related to the "caking" properties of the resin after the powder of each example was stored in a four ounce beaker for a period of 14 days with the powder being heated to a temperature of 105° F. for at least 48 hours and at normal room temperature for the remainder of the storage period. Thereafter, each beaker was inverted and if the powder flowed freely therefrom the anti-caking property of the admixture was rated as "excellent." If some powder fell from the beaker upon inversion and the remainder fell therefrom upon the beaker being dropped a distance equal to its height the anti-caking property was rated as "good." The degree of caking was related to redispersibility and it was found that where the anti-caking properties were "good" or "excellent" the redispersibility of the powder would be rated as "good" when tested in the manner described in connection with Table A. Where it was necessary to force a spatula into the powder to remove it from the beaker anti-caking was rated as "poor" and the redispersibility would also be "poor." Intermediate conditions were rated as "fair." It will be noted that in some instances, a powder rated as "fair" might be right on the borderline of having satisfactory redispersibility.

The water resistance of the film was gauged by each time casting from a 50% solids reconstituted emulsion, the same film thickness and drying under substantially the same conditions. The films were rubbed with a wet rag and visually judged as to the amount the film was affected.

TABLE C

| Example | Admixture | Amount Based on Weight, percent | Anti-Caking Property | Water Resistance |
|---------|-----------|------|---------|---------|
| IX | none | | Poor | fair. |
| X | Methocel [a] | 3 | excellent | Do. |
| XI | Starch | 3 | good | Do. |
| XII | Ethylated starch | 3 | fair | fair-poor. |
| XIII | Sodium sulphate | 3 | good | fair. |
| XIV | ASP 100 [b] | 3 | poor | good. |
| XV | Celite 266 [c] | 3 | do | fair. |
| XVI | HiSil x 303 [d] | 3 | do | good. |
| XVII | ASP 1300 [b] | 3 | do | Do. |

[a] Low viscosity methylcellulose available from the Dow Chemical Company.
[b] Colloidal aluminum silicate clay available from Minerals and Chemicals Corp. of America.
[c] Diatomaceous earth available from Johns-Manville Sales Corporation.
[d] Colloidal silica available from Pittsburgh Plate Glass Co.

Examples X-XIII illustrate that the anti-caking properties provided by the hydrophilic colloid and soluble salt admixtures are good to excellent. On the other hand, Examples XIV-XVII illustrate that inert solids admixtures, while less effective in preventing caking, improve the water resistance of the film cast from a reconstituted emulsion or have no harmful effects on such films.

*Example XVIII*

Storage stability was further improved by spray drying resin emulsion B with an admixture of Methocel in the amount of 5% with a dryer outlet temperature of 110° F. The spray dried powder was stored at ordinary room temperature for a period of one year. After this time the powder was tested in accordance with the procedure outlined above and its anti-caking properties were found to be "good" and its redispersibility was also "good."

To this point, single ingredient admixtures have primarily been dealt with. While a single ingredient admixture suffices for many purposes it may be equally or more advantageous that the admixture comprises various combinations of ingredients selected from any or all of the specified classes. One preferred combination of ingredients is obtained by selecting a solid inert material and combining it with a hydrophilic colloid or a soluble salt. When such a combination admixture is introduced into a resin emulsion before spray drying, the drier outlet temperature may be raised in the same fashion as is demonstrated by the examples of Table A. The resultant powder will have the storage stability of Examples X-XIII (Table C) and be capable, upon redispersion, of casting a film having a water resistance substantially equivalent to that reflected by Examples XIV-XVII.

Of the various admixtures above-described, certain combinations and quantities have been found preferable for the spray drying of polyvinyl acetate emulsions. More particularly, Methocel (methylcellulose) has been found to be the preferred hydrophilic colloid for increasing permissible drying temperatures and giving a high degree of storage stability in the spray dried product. The spray dried product is further improved by combining with the Methocel a colloidal silica such as HiSil 233, available from the Pittsburgh Plate Glass Company, in the admixture which is introduced into the resin before spray drying. The use of an admixture which is a combination of Methocel and HiSil 233 gives both good storage stability and superior water resistance for the film cast from a reconstituted emulsion as will be seen in the following Example XIX.

*Example XIX*

An admixture consisting of 1.5% Methocel and 4% HiSil 233 was added to resin emulsion B (defined in Example II) after polymerization. The resin emulsion and admixture were atomized in the spray drying apparatus in the manner described above. The outlet temperature was maintained at 122° F. and the spray dried powder collected was extremely fine and free flowing. The redispersibility of this powder was tested in accordance with the standards above given and was found to be excellent.

The caking properties of the powder were also tested in the manner described in connection with Examples IX-XVII and the anti-caking properties were found to be good. A reconstituted emulsion was formed from the spray dried powder and the water resistance of the film cast therefrom was found to be good.

The above examples are illustrative and the limits of the invention are set forth in the following claims which specifiy the features claimed as novel and desired to be secured by Letters Patent of the United States. It will be obvious to the man skilled in the art that variations of the compositions and processes other than those shown herein are possible, hence within the scope of this invention.

What is claimed is:

1. The process of spray drying a film forming vinyl acetate resin emulsion at elevated temperatures to produce a powder which can be redispersed in water to reconstitute the original emulsion substantially (a) the original emulsion having been produced by polymerization of an aqueous emulsion and containing resin particles of from 0.5 to 8 microns in diameter, (b) the powder being free flowing on storage at room temperature and on heating at 105° F. for 48 hours, and consisting of particles having a diameter of up to 100 microns comprising a plurality of the emulsion resin particles among which is interspersed a separator material, (c) the separator material belonging to the class consisting of water insoluble inert solids having a particle diameter of 0.005 to 8 microns and mixtures of said solids with hydrophilic colloids.

(d) said separator material having been added to the polymerized emulsion after polymerization and prior to spray drying in an amount equal to 1 to 300% by weight, based on the resin content of the emulsion, (e) the emulsion being spray dried at an outlet air temperature between above room temperature and 200° F., said temperature being higher than the maximum drying temperature which would be usable to produce redispersible powders from the resin emulsion in the absence of the separator material.

2. The process of claim 1 wherein 3 to 25% by weight, based on the resin content of the emulsion, of aluminum silicate having a particle size within the range of 0.2 to 2 microns in diameter is used as the separator material.

3. The process of claim 1 wherein 3 to 25% by weight, based on the resin content of the emulsion, of a mixture of an hydrophilic colloid with a water soluble inert solids having a particle size within the range of 0.2 to 2 microns in diameter is used as the separator material.

4. The process of claim 3 wherein the hydrophilic colloid used is polyvinyl alcohol.

References Cited in the file of this patent

UNITED STATES PATENTS

| | | |
|---|---|---|
| 2,227,163 | Stark et al. | Dec. 31, 1940 |
| 2,290,794 | Alvarado et al. | July 21, 1942 |
| 2,507,688 | Armstrong | May 16, 1950 |
| 2,687,394 | Somermeyer | Aug. 24, 1954 |
| 2,713,563 | Kuhn | July 19, 1955 |
| 2,733,995 | Robinson | Feb. 7, 1956 |
| 2,741,650 | Lukman et al. | Apr. 10, 1956 |
| 2,782,180 | Weidman | Feb. 19, 1957 |
| 2,800,463 | Morrison | July 23, 1957 |
| 2,808,381 | Stone | Oct. 1, 1957 |
| 2,850,468 | Giggey | Sept. 2, 1958 |